April 8, 1924.
C. H. FREBERG
WHEEL MOUNTING
Filed Sept. 24, 1923
1,489,491
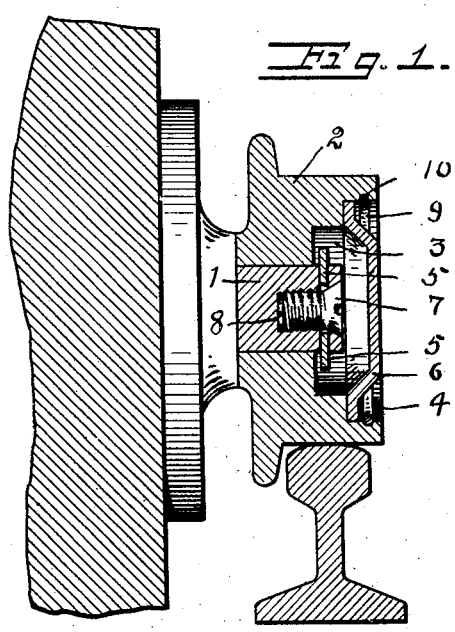
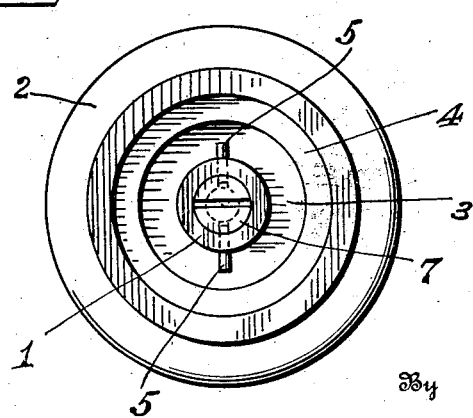
Inventor
Chas. H. Freberg.
By Geo Stevens.
Attorney Patented Apr. 8, 1924.

1,489,491

UNITED STATES PATENT OFFICE.

CHARLES H. FREBERG, OF CROSBY, MINNESOTA.

WHEEL MOUNTING.

Application filed September 24, 1923. Serial No. 664,456.

*To all whom it may concern:*

Be it known that I, CHARLES H. FREBERG, a citizen of the United States, residing at Crosby, in the county of Crow Wing and State of Minnesota, have invented certain new and useful Improvements in Wheel Mountings, of which the following is a specification, reference being had therein to the accompanying drawing.

This invention relates to wheel mountings and has special reference to a traction wheel mounted on a stub axle, such, for example, as employed upon mining skips.

The principal object of the invention is to produce a wheel mounting which is easily accessible for oiling purposes and one that may be readily removed for renewal or repairs.

Other objects and advantages of the invention will appear in the further description thereof.

Referring to the accompanying drawing forming part of this application in which like reference characters indicate like parts:

Figure 1 is a vertical sectional view through one of the improved wheels and axles, the former being shown in working position upon the latter.

Figure 2 is an enlarged elevation of the side of the wheel, showing the end of the axle, with the cap removed.

1 represents the axle, upon which the traction wheel 2 is mounted, the axle being somewhat shorter than the full width of the wheel. The outer face of the wheel is cut away in stepped concentric form providing the inner recess or chamber 3 and the outer recess 4. The axle 1 protrudes into the inner chamber where it is provided with two opposed radially disposed pins 5, which, when thrust outwardly with their outer ends extending into the inner chamber 3, will prevent the removal of the wheel from the axle. An internally threaded axial cavity 8 is formed within the axle and normally closed by the taper headed externally threaded plug 7, and it is evident that when the plug is in position within the axle the pins 5 must remain in their extended position, thus holding the wheel on the axle.

Within the outer chamber 4 is placed a circular concavo-convex disc cover or cap 6, it being held in position by an annular spring ring 9 which snaps into the annular groove 10 formed in the circumferential edge of the chamber. In this manner a grease compartment is formed about the end of the axle and may be packed as is common in such devices prior to the application of the cover 6 thus affording an ideal means for lubricating the bearing.

From the foregoing it is evident that I have devised an exceedingly simple axle and wheel combination which may not only be applicable to a traction wheel, but other forms of wheels and pulleys may be mounted in this manner when desired and the same prove more efficient than mountings at present employed.

Having thus described my invention, what I claim and desire to secure by Letters Patent, is—

In combination, an axle having radially disposed reciprocable pins adjacent the outer end thereof and an axial internally screw threaded hole within the end, a wheel for said axle extending considerably beyond the end thereof having a recess concentric therewith into which the pins are extendable, an externally screw threaded set screw in the axial hole in the axle the head of said screw being flush with the end of the axle and the screw threaded portion inwardly of the pins, a second stepped recess concentric with the first mentioned recess, and a cap removably carried within the last mentioned recess, forming a lubricating chamber wholly about the end of the shaft and pins, said cap being flush with the outer face of the wheel.

In testimony whereof I hereunto affix my signature in the presence of two witnesses.

CHARLES H. FREBERG.

Witnesses:
P. FREWETTE,
A. E. LONDAHL.